March 14, 1933. C. W. GREEN 1,901,097
CASH REGISTER
Original Filed Oct. 20, 1925 3 Sheets-Sheet 1

Inventor
Charles W. Green,
By
Attorney

March 14, 1933. C. W. GREEN 1,901,097
CASH REGISTER
Original Filed Oct. 20, 1925  3 Sheets-Sheet 2
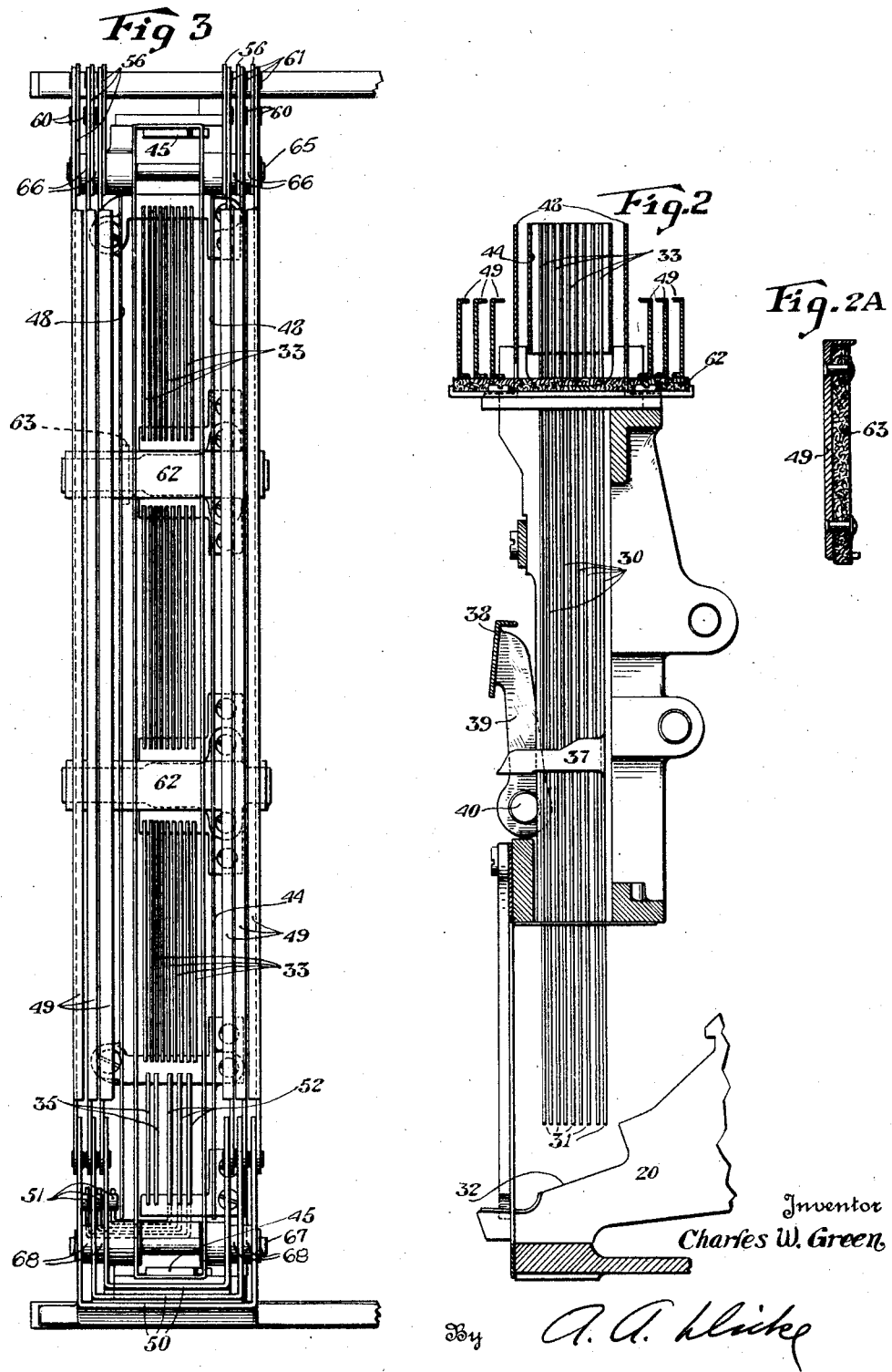
Inventor
Charles W. Green March 14, 1933.  C. W. GREEN  1,901,097
CASH REGISTER
Original Filed Oct. 20, 1925    3 Sheets-Sheet 3
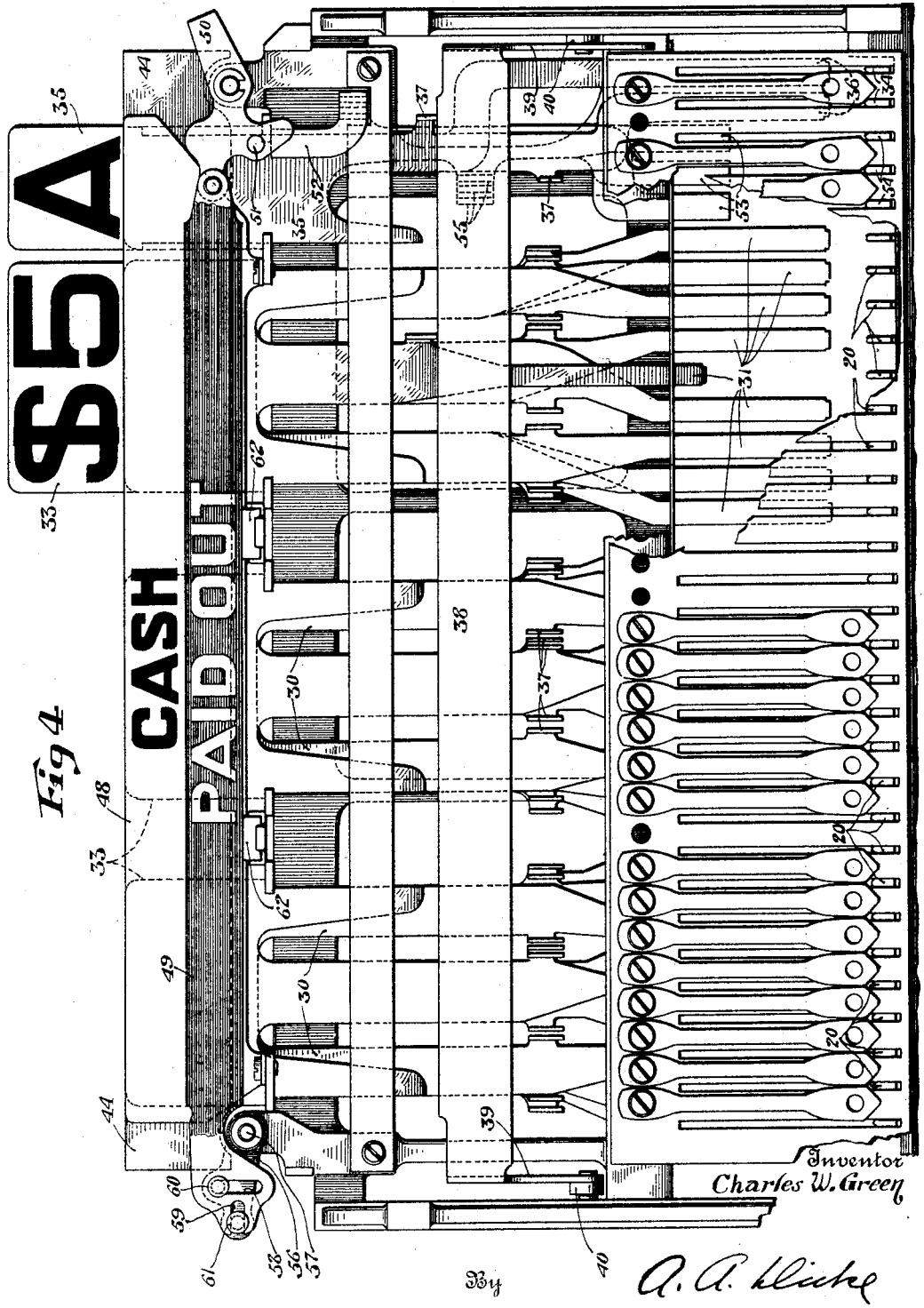

Patented Mar. 14, 1933

1,901,097

UNITED STATES PATENT OFFICE

CHARLES W. GREEN, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Original application filed October 20, 1925, Serial No. 63,695. Divided and this application filed June 7, 1927. Serial No. 197,088.

This invention relates to cash registers in general and more particularly to indicating mechanisms therefor.

This application is a division of the copending application of Charles W. Green, Serial Number 63,695, filed October 20, 1925, to which reference may be had for a more complete description of the cash register to which the present invention has been applied. While the improvements set forth in this application are shown applied to a particular type of cash register illustrated in the parent application their utility is by no means limited to this specific embodiment. The improvements are of such a nature that they may be applied in various modifications to many other kinds and principles of cash registers and accounting machines.

The main object of the present invention is to provide an improved type of indicating mechanism whereby the numerals representing the amount of a sale and special identifying characters may be publicly indicated in an improved manner.

It is also an object of the invention to provide an improved construction of the means employed for holding up the operated tablets and releasing the tablets previously operated. In connection with the amount indicators it is also an object of the invention to arrange the indicators and associate them with the amount keys in such a manner that the indicators of each particular denomination are grouped together, thereby preventing adjacent indicators from overlapping each other as would happen if they were otherwise arranged. By virtue of the present arrangement there is secured greater compactness and simplicity of construction and the mechanism by which this is done being more easily operated and more cheaply manufactured.

The machine disclosed in the present application is equipped with an indicating mechanism adapted to indicate to the front and to the rear, not only the amount of a transaction but the clerk making the entry, as well as the nature of the transaction being performed. It is particularly in connection with the latter indicators that a novel construction is provided. In order that the transactions may be indicated by full words rather than by the customary abbreviations, such as P. O. for "Paid out", R. Acc't for "Received on account", etc., the machine herein disclosed is provided with a series of long, narrow indicator plates extending across the full width of the machine and mounted at opposite ends on pairs of arms so that it may be moved from a lower, concealed position to an upper exposed position by a parallel link motion. Suitable connections are provided from the arm supporting one end of each indicator plate to the corresponding special transaction key. Provision is also made for retaining an indicator in exposed position after it has been elevated, and for releasing and dropping the exposed indicator into concealed position during the beginning of a succeeding operation. For the purpose of indicating a "Cash" transaction, which is by far the most frequent entry to be made, a fixed indicator is employed and this is adapted to be concealed by any of the other transaction indicators which may be elevated.

Many other objects of the present invention will appear from the detailed description which will follow. While the invention will be described hereinafter as applied to a specific form of machine it will be clear that the novel features are capable of broader application to other forms of accounting machines falling within the terms of the appended claims and the present disclosure is merely of one preferred form of embodiment of the invention.

Reference will now be had to the figures of the drawings, which, taken in connection with the detailed description, which will follow, constitute a full disclosure of one form of the invention.

In the drawings:

Fig. 2 is a section in side elevation of the machine showing the arrangement of the indicating mechanism associated with the various groups of keys.

Fig. 2A is a cross sectional view of an indicator plate provided with a strip of felt for eliminating the noise caused by the dropping of the indicator.

Fig. 3 is a top plan view of the indicating mechanism showing how the different groups of indicators are arranged and the relation they bear to each other.

Fig. 4 is a rear elevation of the machine with some of the frame structure cut away to disclose the arrangement of a part of the indicator mechanism.

Figure 1:
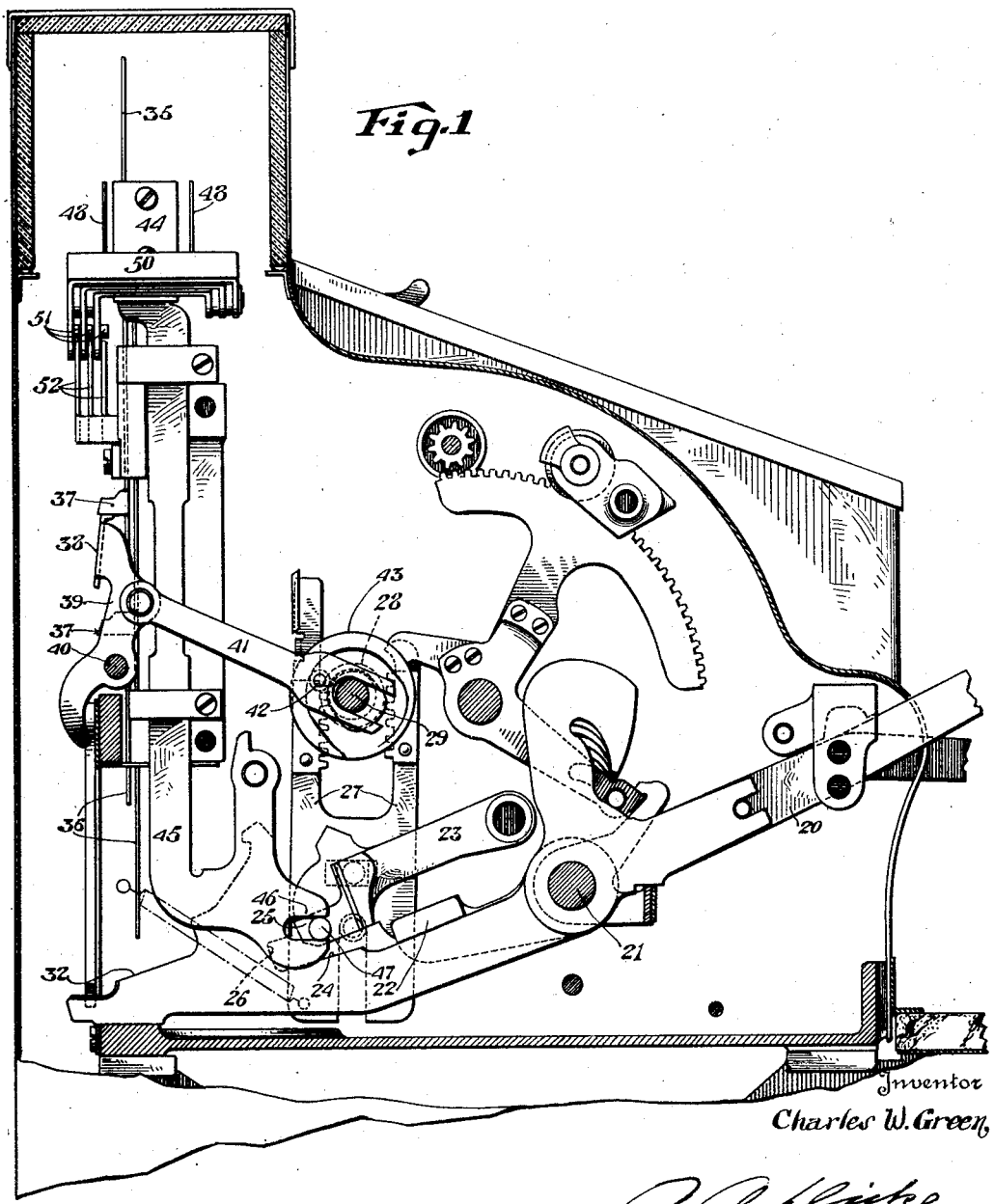
Fig. 1 is an end view of the machine to which the present improvements are applied showing the arrangement of the operating keys and the mechanism utilized to retain and release the indicators.

A detailed description will now be given of the essential elements of the machine embodying the broad invention defined by the appended claims.

The illustrative machine is of the key-operated type of cash register and is provided with the usual series of operating keys, including amount keys 20 (Figs. 1 and 4) and a number of special keys which will be later described.

The operating keys 20 as shown in Fig. 1, are all mounted on a shaft 21 extending across the machine and the keys are normally maintained with their forward operating ends elevated by means of a weighted bail 22 extending across the tops of all the keys in rear of their pivots, the bail having a plurality of arms extending forwardly and pivoted about the key shaft 21. Depression of the forward end of any key will serve to elevate the weighted bail 22 and carry the upper surface of the latter substantially into engagement with the under cut-out surface of a key coupler 23. At the same time, an upper surface 24 toward the rear end of the key will engage the under surface of a projecting lip 25 of the key coupler. Continued depression of the forward end of the key will then serve to elevate the key coupler 23 as well as the bail 22 and during this continued movement of the parts the lip 25 of the coupler will enter the notch 26 of the operated key.

The usual connections are provided from the key coupler to a main operating shaft within the machine, these connections comprising a double rack member 27 (Fig. 1) having sets of oppositely facing rack teeth adapted to alternately engage a pinion 28 mounted on a main operating shaft 29. As is well known in the art, the oscillation of the key coupler by the depression and return of one or more of the operating keys will serve to produce a full rotation of the shaft 29.

In the machine herein disclosed, means are provided for indicating to both the front and the rear in large letters and figures the amount of a given transaction, the clerk entering the transaction into the machine and the nature of the transaction.

The amount indicators comprise a series of targets or tablets 30 each having a stem 31 (Fig. 4) which is suitably bent and directed to normally stand above one of the amount keys so that upon depression of the latter a surface 32 (Fig. 1) at the rear end of the key will engage its associated stem 31 and elevate the latter until an indicating head 33 is in exposed position. As clearly illustrated in Figs. 3 and 4, the indicator heads are arranged in aligned groups from front to rear of the machine so that, for example, all of the dollars indicators are one directly behind the other. The main members of the indicator targets of each group are divided into three separate groups, with three members aligned in each, while the stems extending from these members are further separated to form a file of nine stems, directly above the related key levers. (See Fig. 4.)

The indicators associated with the clerks' keys 34 (Fig. 4) are substantially the same as those associated with any group of amount keys. Thus, a plurality of targets 35 carrying aligned indicating heads with designations to indicate the particular clerk's key which has been operated are provided and have their stems 36 extending over the appropriate ones of the clerks operating key levers.

For the purpose of maintaining the raised indicator tablets in exposed position, between operations of the machine, each indicator is provided with a rearwardly extending extension 37 which is adapted to co-operate with a bail 38 pivoted by a pair of downwardly extending arms 39 on studs 40 mounted on the side frames of the machine. An indicator of each group, to represent amounts and clerks, may be elevated simultaneously, and as the rearward extension of each such indicator passes the bail 38 the latter will be rocked slightly rearwardly (Fig. 1) until the extensions clear the bail, at which time the latter will be moved by means to be described, under the extensions and maintain the indicators in exposed position. During the next operation of the machine, however, a pitman 41 (Fig. 1) which is connected to one of the arms of the bail 39, will serve to rock the latter rearwardly by the co-operation of a pin or roller 42 on the pitman with a box cam 43 mounted on the shaft 29. Through the connection mentioned, any indicators which were exposed by the preceding operation of the machine will be released during the first part of the downward movement of the keys, so that a new set of indicators may be selected and held.

In order that the amount and clerks' indicators which are being elevated, during an operation of the machine, may not be visible to a customer or the clerk operating the machine until the entry of a transaction has been fully completed, a concealing flash has been provided and is connected for movement by the key coupler. The flash, which is designated 44 is in the nature of a rectangular box surrounding all of the amount and clerk's indicators and is attached by some suitable means, such as screws, to a pair of upright supporting slides 45. The latter are each provided with a forked extension 46 (Fig. 1) adapted to engage a pin 47 carried by the lip 25 of the key coupler. Through the pin and slot connection, as the key coupler rises the pair of slides 45 and hence the flash 44 will be raised simultaneously with the selected indicators, and it is not until the key coupler is restored to its normal position of rest that the selected indicators will be fully exposed to the customer.

The present invention contemplates the use of a plurality of elongated indicator plates, bearing designations in full words of the various transactions capable of being entered into the machine. Since, by far, the greater number of transactions performed on any machine are usually cash transactions, it has been found desirable to employ a pair of fixed indicators 48, extending across the machine and each provided with the word "Cash". These fixed indicators are in normally exposed position, where one will indicate to the front of the machine and the other to the rear that the last transaction was a "Cash" sale. Whenever a transaction of a different character is being registered a pair of separate indicator plates are elevated, by mechanism which will now be explained, so that the new plates will conceal the fixed normally visible cash indicators.

In the machine illustrated in the drawings three pairs of special transaction indicators 49 are provided, so that one pair may indicate a "Charge" transaction, another pair a "Paid out" transaction and still another pair a "Received on account" transaction, one indicator of each pair being visible from the front of the machine and the other from the rear of the machine. In order that the raising of each of the elongated indicators, having the full word designations, may be readily accomplished from one end of the machine (being that end at which the special transaction keys are located) each indicator is mounted on a pair of pivoted arms, so that the plate may be raised from concealed to exposed position by a parallel link motion. The arms for supporting the special indicator plates at the left hand end of the machine (Fig. 3) are formed into bails 50, each of which serves to connect the pair of arms to which are attached the associated front and back indicators representing a particular transaction. One arm of each bail member 50 is provided with a pin 51 (Fig. 4) which is in the path of movement of a vertically movable operating slide 52. The latter has a stem 53 (Fig. 4) which is adapted to be engaged by a surface at the rear of a related transaction key 54 in a manner similar to the stems of the amount and clerk's indicators, although the stems of these slides are somewhat shorter, as shown in Fig. 4, and the movement imparted to the transaction indicators is consequently less than that imparted to the amount and clerk's indicators. The slides 52 are, furthermore, provided with rearward extensions 55, which are adapted to co-operate with the bail 38 to maintain the associated transaction indicators in exposed position between operations of the machine, similar to the amount and clerk's indicators. The opposite or right hand ends of the indicator plates (Fig. 4) are connected with arms 56 pivoted on a rod 57 and in order to permit the desired parallel movement of the indicators the connection between each indicator and its arm 56 comprises a vertical slot 58 and a horizontal slot 59 in the indicator plate co-operating with studs 60 and 61, respectively, carried by the arm. From Fig. 4, it will be clear that if the "Paid out" key is depressed, during an operation of the machine, its associated indicator operating slide 52 will be elevated and will engage the pin 51 to rock the bail 50 to which it is secured and thereby elevate the pair of indicator plates bearing the full word designation "Paid out". Through the double pin and slot connections with the arms 56 at the right hand end of these indicator plates the latter will be elevated by a parallel movement, to expose their designations and to conceal the cash indicators. Co-operation of the projection 55 of the slide 52 with the bail 38 will serve to maintain the pair of "Paid out" indicators in exposed position until the subsequent operation of the machine, when they will be dropped to either expose the fixed cash indicators or be replaced by another pair of transaction indicators. The transaction indicators are spaced from each other so that each may move past the adjacent indicators without interference therewith. The means for spacing these indicators is clearly shown in Fig. 3 and comprises spacing washers 66 mounted on shaft 65 and arranged between the adjacent arms 56; also, on shaft 67 similar spacing washers 68 are provided between the adjacent bails 50. Thus, since the bails 50 and arms 56 are attached to their respective indicators at opposite ends thereof, the provision of spacing washers in this manner forms an effective means for spacing the indicators. In place of washers, bosses may be formed in the respective bails and arms aforesaid, thereby permitting sufficient clearance space between adjacent indicators to prevent interference thereof when any one of the indicators is selected for operation.

For the purpose of arresting the indicators when they are dropped a plurality of blocks 62 (Fig. 4) are provided and these may be of metal or, in order to prevent any undue metallic noises in the dropping of the long transaction indicators, during an operation of the machine, they may be in the form of felt pads (see Fig. 2), extending from front to rear of the indicator supporting frame. Furthermore, for the purpose of further reducing the metallic noises, each of the indicators may, if desired, be provided with a strip of felt 63 mounted in the channel on the reverse side of the channel form indicating plate, as shown in Fig. 2A.

While the form of mechanism herein described is admirably adapted to fulfill the objects primarily stated, it is to be understood that it is not intended to confine the invention to the one form of embodiment herein shown, since it may be embodied in various forms, all coming within the scope of the claims which follow.

What is claimed is:

1. In a machine of the class described, a special key, a pair of normally concealed indicators associated with said key, a pair of parallel links for supporting the opposite ends of each of said indicators, a bail connecting the links at one end of said pair of indicators, and means for rocking said bail to rock said pairs of links to cause said related pair of indicators to be elevated into exposed position.

2. In a machine of the class described, a plurality of special keys, a plurality of indicators arranged in pairs, each pair related to one of said special keys, links for supporting said indicators at opposite ends to permit movement of the indicators and to maintain them in constantly parallel relation to the base of the machine, means associated with said special keys for lifting the associated pairs of indicators from a concealed to an exposed position, means for retaining a pair of lifted indicators in exposed position and means for releasing said indicators upon a subsequent operation of the machine.

3. In a machine of the class described, a plurality of special keys, indicators associated with said keys bearing full word designations descriptive of said keys, pivoted means for supporting said indicators at opposite ends, said means permitting the movement of said indicators from a concealed to an exposed position and maintaining said indicators constantly in a horizontal position, and connections from said special keys for lifting said indicators into exposed position.

4. In a machine of the class described, a plurality of special keys, indicators associated with said keys bearing full word designations descriptive of said keys, pivoted means for supporting said indicators at opposite ends, said means permitting the movement of said indicators from a concealed to an exposed position and maintaining said indicators constantly in a horizontal position, connections from said special keys for lifting said indicators into exposed position, means for retaining an elevated indicator in exposed position, and means operated by a special key for releasing a previously elevated indicator.

5. In a machine of the class described, a plurality of special keys, a plurality of indicators, one of said indicators being fixed and normally exposed and the remaining indicators being movable and normally concealed, means whereby said movable indicators are constantly maintained horizontal, and connections from each special key to one end of an associated movable indicator for lifting the same into exposed position whereby the fixed indicator becomes concealed.

6. In a machine of the class described, a plurality of transaction keys, a plurality of elongated indicator plates normally concealed, connections from said keys for elevating said indicator plates to exposed position, means for retaining said plates in exposed position when elevated, means for releasing said retaining means and permitting restoration of said plates to normal concealed position, and a felt pad secured to each of said plates to deaden the sound of impact when said indicator plates are restored.

7. In a machine of the class described, a plurality of special indicator plates each extending across the machine, means for supporting each of said indicators at opposite ends thereof for parallel movement in a single plane from concealed to exposed positions, means for spacing said indicators to prevent contact between adjacent plates, and means for moving any desired one of said indicator plates individually from concealed to exposed positions.

8. In a machine of the class described, a special indicator plate extending across the machine, a pair of pivoted arms supporting said plate at opposite ends, a double pin and slot connection between said plate and the arm at one end, a pivotal connection between the plate and arm at the opposite end, and means for rocking the second mentioned arm and thereby elevating the indicator to exposed position.

9. In a machine of the class described, the combination of a special indicator plate extending across the machine, a pair of pivoted arms supporting said plate at opposite ends one of said arms being connected to the plate by a pin carried by the said arm engaging an open-ended slot formed in the indicator plate, and means for preventing disengagement of the pin from said slot.

10. In a machine of the class described, the combination of a special indicator plate extending across the machine, a pair of pivoted arms supporting said plate at opposite ends one of said arms being connected to the plate by a pin carried by the said arm engaging an open-ended slot formed in the indicator plate, means for preventing disengagement of the pin from said slot, said means comprising a supplemental pin engaging a closed slot formed in the indicator plate.

11. In a machine of the class described, the combination of a special indicator plate extending across the machine and normally parallel to the base of the machine, an arm pivoted to one end of the plate, means for moving said arm, and means for supporting the other end of the indicator plate so constructed and arranged that when the first mentioned arm is moved the parallel relation between the indicator plate and base of the machine will be maintained during the movement of said plate.

12. In a machine of the class described, the combination with an indicator extending across the machine, supporting means for said indicator arranged at opposite ends thereof, said supporting means being so arranged as to permit movement of the indicator vertically in a single plane but along the plane, and means for moving the indicator.

13. In a machine of the class described, a plurality of special indicator plates extending across the machine, pivoted means for supporting each of said indicators for parallel movement in a single vertical plane from concealed to exposed position, means for spacing said indicators to prevent contact between adjacent plates, and means acting upon the said pivoted means to move the said indicator plates individually from concealed to exposed position.

14. In a machine of the class described, a plurality of amount keys, a plurality of special keys, a fixed indicator normally exposed, amount indicators adapted to be concealed thereby, a plurality of normally concealed indicators associated with said special keys, and means whereby any amount key may elevate the selected amount indicators and operate a special indicator for exposing the latter following selection of said indicator by a special key, said special indicator when in exposed position concealing the said fixed indicator.

15. In a machine of the class described, amount indicators having exposed and concealed positions, a fixed special indicator exposed below the exposed position of the amount indicators, a movable special indicator, and means for moving the selected amount indicators and special indicator into exhibiting position in which the fixed special indicator is concealed by the movable special indicator.

16. In a machine of the class described, the combination of a special indicator plate extending across the machine, supports for said plate at opposite ends thereof, actuating means engaging one only of said supports to move said plate, and pivotal means embodied in said supports arranged to cause parallel movement of said plate in a single plane upon movement of said support by said actuating means, said indicator and supports therefor being disposed in the upper extremities of the machine.

17. In a machine of the class described, the combination of a special indicator plate extending across the machine, a pair of arms pivoted to and supporting said plate at opposite ends, means engaging one of said arms for actuating said plate to operative or inoperative position, said plate maintaining a horizontal position throughout its movement.

CHARLES W. GREEN.